E. A. BOOSER.
CAR WHEEL.
APPLICATION FILED JULY 18, 1907.
922,844.
Patented May 25, 1909.
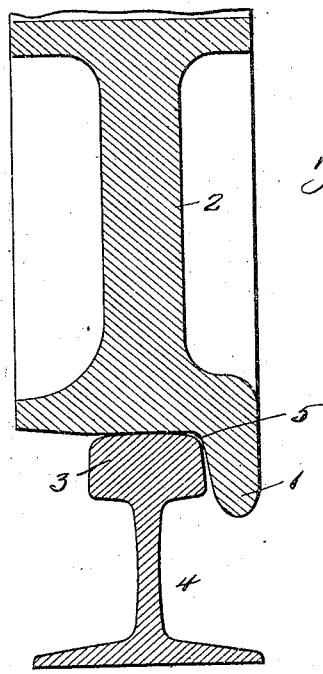
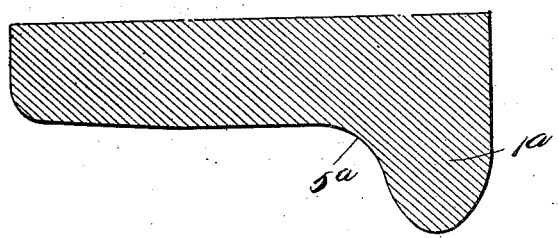
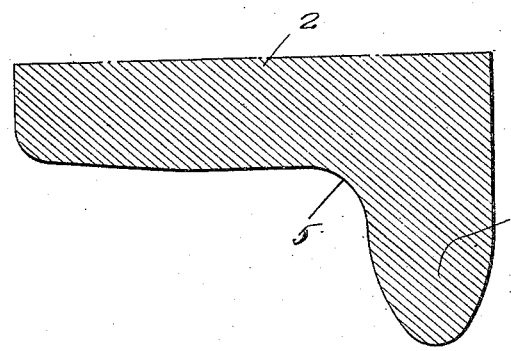
Witnesses
Samuel Payne
X. N. Butler
Inventor
E. A. Booser
By
Attorneys

UNITED STATES PATENT OFFICE.

ELI A. BOOSER, OF ALTOONA, PENNSYLVANIA.

CAR-WHEEL.

No. 922,844.　　　　Specification of Letters Patent.　　　Patented May 25, 1909.

Application filed July 18, 1907. Serial No. 384,417.

*To all whom it may concern:*

Be it known that I, ELI A. BOOSER, a citizen of the United States of America, residing at Altoona, in the county of Blair and State of Pennsylvania, have invented certain new and useful Improvements in Car-Wheels, of which the following is a specification, reference being had therein to the accompanying drawing.

This invention relates to car wheels, and more particularly to what is termed "high-speed car wheel flange", the invention having for its primary object to provide car wheel flanges of greater depth, body and strength to withstand the rough usage to which they are subjected, and at the same time insure perfect safety of a rolling stock equipped with wheels constructed in accordance with my invention.

It is a well known fact that the majority of wrecks and accidents upon railways are due to the derailment of rolling stock, which I have found by experience to be caused by the imperfect construction of the wheel flanges.

Owing to the fact that the speed and weight of rolling stock is constantly increased, little if any attention has been paid to that element of the rolling stock which retains a train, car or engine upon a track and when rounding a curve in a track. It is a well known fact that the flanges of a wheel maintain a train upon a track, when rounding a curve, and receive considerable pressure and sustain practically the entire weight of the train, due to the careening and rocking of the rolling stock. To entirely eliminate all danger of the flange of a wheel from being injured or riding the rail during the progress of a train, I make the flange of a wheel of a sufficient depth and thickness to withstand the stresses and strains to which it is subjected by the momentum and weight of rolling stock.

In order that my invention can be fully understood, I compare the same with the style of flanges at present used, and reference will now be had to the drawing, wherein, Figure 1 is a vertical sectional view of a portion of a wheel provided with a flange constructed in accordance with my invention, illustrating the same with relation to a rail, Fig. 2 is a sectional view of the tread and flange of an ordinary wheel, and Fig. 3 is a similar view of a tread and flange constructed in accordance with my invention.

My invention resides in increasing the depth and width of a wheel flange, thereby obtaining a greater body of metal conducive to the proper manufacture of a car wheel, and at the same time providing a wheel of considerable strength, durability and qualifications, essential to speed of rolling stock.

In the first place, I increase the width of the tread of the wheel. In the present type of wheel used five and one-half inches is provided for direct bearing upon a rail, while with my improved wheel I provide a tread of six inches, that is from the outside of the flange to the outside of the wheel rim. I then increase the depth of the flange, which in the present type of wheel is $1^{3}/_{16}$ of an inch, to two inches, thus adding the one-half inch of metallic thickness which increases the tread of the wheel.

In increasing the cross area of the flange of the wheel, I provide sufficient metal to allow of a properly chilled tire being formed upon the wheel, thus preventing the throat of a flange from being worn to that extent that the flange can be easily broken or cracked due to the shearing stresses and strains to which the same is subjected.

By referring to the drawings, it will be observed that the flange 1 of a wheel 2 extends a considerable distance beneath the head or tread 3 of the rail 4, while the thickness of the flange from the throat 5 thereof to the outer edge of the flange is sufficient to permit of the tread or tire of the wheel being properly chilled when made of cast steel.

By referring to the old type of flange and tread illustrated in Fig. 2 of the drawings, it will be observed that the flange 1$^a$ is practically half the depth of the flange 1 and that the throat 5$^a$ of the flange 1$^a$ is of such contour as to permit of a wheel readily mounting the rail and causing a derailment of the rolling stock.

In enlarging the flange of the wheel, I have taken into consideration railroad structures, as frogs, guard rails and rail joints, whereby the increase in thickness and depth of a wheel flange will not interfere with either of the structures specified.

From the foregoing I believe that the many advantages of a wheel constructed in accordance with my invention will be readily understood by those conversant with the art of rolling stock, and while I have herein considered the most important elements entering into the chances for derailment of rolling equipment, there are numerous other instances that are common in cases of derailment, all of which are due to the small and defective flange at present used upon the wheels of rolling stock.

Having fully described my invention, what I claim and desire to secure by Letters Patent is:

A car wheel embodying a tread portion and a flange, said flange having its throat chilled and in vertical section having its greater length in a vertical line at the center, said flange in vertical section of a length as to depend below the plane of the lower face of the head of a rail and having that portion which is in a plane below the lower face of the head of the rail substantially acorn-shaped in cross vertical section, said flange in vertical section having a portion of its outer face perpendicular, said perpendicular portion of a length as to extend from the lower face of the head of the rail to beyond the upper face of the head of the rail and said flange in vertical section having that portion of its inner face extending from that portion which is in a plane below the lower face of the head of the rail and which merges in the tread of the wheel of compound curvature.

In testimony whereof I affix my signature in the presence of two witnesses.

ELI A. BOOSER.

Witnesses:
MARY C. MACCORMAC.
W. R. WEAVER.